(12) United States Patent
O'Bleness et al.

(10) Patent No.: US 11,269,799 B2
(45) Date of Patent: Mar. 8, 2022

(54) CLUSTER OF PROCESSING ELEMENTS HAVING SPLIT MODE AND LOCK MODE

(71) Applicant: Arm Limited, Cambridge (GB)

(72) Inventors: R Frank O'Bleness, Tempe, AZ (US); Erez Amit, Chandler, AZ (US)

(73) Assignee: Arm Limited, Cambridge (GB)

( * ) Notice: Subject to any disclaimer, the term of this patent is extended or adjusted under 35 U.S.C. 154(b) by 215 days.

(21) Appl. No.: 16/402,320

(22) Filed: May 3, 2019

(65) Prior Publication Data

US 2020/0348985 A1 Nov. 5, 2020

(51) Int. Cl.
*G06F 13/40* (2006.01)
*G06F 12/084* (2016.01)
*G06F 12/0815* (2016.01)
*G06F 11/16* (2006.01)

(52) U.S. Cl.
CPC ...... *G06F 13/4027* (2013.01); *G06F 11/1641* (2013.01); *G06F 12/084* (2013.01); *G06F 12/0815* (2013.01); *G06F 2212/62* (2013.01)

(58) Field of Classification Search
CPC ............ G06F 11/1641; G06F 11/1645; G06F 12/084; G06F 12/0815; G06F 11/1629; G06F 11/1654
See application file for complete search history.

(56) References Cited

U.S. PATENT DOCUMENTS

| | | | | |
|---|---|---|---|---|
| 6,615,366 B1 * | 9/2003 | Grochowski | ....... | G06F 9/30076 712/1 |
| 2002/0152420 A1 * | 10/2002 | Chaudhry | ............ | G06F 11/184 714/11 |
| 2003/0131197 A1 * | 7/2003 | Morrison | ............ | G06F 11/1637 711/130 |
| 2008/0163035 A1 * | 7/2008 | Kottke | ................ | G06F 9/30189 714/799 |
| 2008/0320230 A1 * | 12/2008 | Vishin | ................ | G06F 12/0817 711/141 |
| 2011/0179308 A1 * | 7/2011 | Pathirane | .............. | G06F 11/073 714/37 |
| 2012/0272007 A1 * | 10/2012 | Moyer | .................. | G06F 12/126 711/128 |
| 2015/0286597 A1 * | 10/2015 | Vajapeyam | ......... | G06F 12/0817 710/308 |

(Continued)

FOREIGN PATENT DOCUMENTS

WO    WO-2017109449 A1 *   6/2017   ......... G06F 12/0842

*Primary Examiner* — Bryce P Bonzo
*Assistant Examiner* — Albert Li
(74) *Attorney, Agent, or Firm* — Nixon & Vanderhye P.C.

(57) ABSTRACT

A cluster of processing elements has a split mode in which the processing elements are configured to process independent processing workloads, and a lock mode in which the processing elements comprise at least one primary processing element and at least one redundant processing element, each redundant processing element configured to perform a redundant processing workload for checking an outcome of a primary processing workload performed by a corresponding primary processing element. A shared cache is provided, having a predetermined cache capacity accessible to each of the processing elements when in the split mode. In the lock mode, the predetermined cache capacity of the shared cache is fully accessible to the at least one primary processing element.

17 Claims, 7 Drawing Sheets

(56) References Cited

U.S. PATENT DOCUMENTS

2018/0157545 A1\* 6/2018 deLescure ........... G06F 12/0837
2018/0157549 A1\* 6/2018 Han ................... G06F 12/0868
2019/0163583 A1\* 5/2019 Fahim ................. G06F 11/2017

\* cited by examiner

CLUSTER OF PROCESSING ELEMENTS HAVING SPLIT MODE AND LOCK MODE

BACKGROUND

Technical Field

The present technique relates to the field of data processing.

Technical Background

In some fields, it can be important to provide processing hardware which provides a certain level of guarantee of functional safety. For example this can be useful for processing systems designed for the use in the automotive field, such as processors for controlling the braking or steering system in a vehicle. One technique for providing functional safety can be to provide a lock mode in which a redundant processing element may duplicate the same processing workload that is being performed by a primary processing element, so that the outcomes can be compared to detect errors.

SUMMARY

At least some examples provide an apparatus comprising:
a cluster of processing elements, having a split mode in which the processing elements are configured to process independent processing workloads, and a lock mode in which the processing elements comprise at least one primary processing element and at least one redundant processing element, each redundant processing element configured to perform a redundant processing workload for checking an outcome of a primary processing workload performed by a corresponding primary processing element; and
a shared cache having a predetermined cache capacity accessible to each of the processing elements when in the split mode; in which said predetermined cache capacity of the shared cache is fully accessible to the at least one primary processing element when in the lock mode.

At least some examples provide an apparatus comprising:
a cluster of means for data processing, having a split mode in which the means for data processing are configured to process independent processing workloads, and a lock mode in which the means for data processing comprise at least one primary means for data processing and at least one redundant means for data processing, each redundant means for data processing configured to perform a redundant processing workload for checking an outcome of a primary processing workload performed by a corresponding primary means for data processing; and
shared means for caching data, having a predetermined cache capacity accessible to each of the means for data processing when in the split mode; in which said predetermined cache capacity of the shared means for caching data is fully accessible to the at least one primary means for data processing when in the lock mode.

At least some examples provide a data processing method for an apparatus comprising a cluster of processing elements, the method comprising:
when in a split mode, processing independent processing workloads using the cluster of processing elements, and accessing a shared cache having a predetermined cache capacity accessible to each of the processing elements in the split mode; and
when in a lock mode, performing a primary processing workload on at least one primary processing element of the cluster, and performing a redundant processing workload on at least one redundant processing element of the cluster, each redundant processing workload for checking an outcome of a corresponding primary processing workload performed by a corresponding primary processing element of the cluster; in which:
said predetermined cache capacity of the shared cache is fully accessible to the at least one primary processing element when in the lock mode.

Further aspects, features and advantages of the present technique will be apparent from the following description of examples, which is to be read in conjunction with the accompanying drawings.

DESCRIPTION OF EXAMPLES

A cluster of processing elements may be provided with a split mode and a lock mode. In the split mode, the processing element may process independent processing workloads. In the lock mode, the processing element may comprise at least one primary processing element and at least one redundant processing element, with each redundant processing element performing a redundant processing workload for checking an outcome of a primary processing workload performed by a corresponding primary processing element. Hence, this provides the flexibility to trade off performance against functional safety. For a use case which does not require a guarantee of functional safety, the split mode can be selected to improve performance, so that a greater number of independent processing workloads can be performed on the respective processing element than in the lock mode. However, for a use case which requires functional safety guarantees, the lock mode can be selected and the redundant processing workload performed on each redundant processing element can be used to check the outcome of the primary processing workload on a primary processing element, to allow detection of errors arising from hard circuit faults or interference from subatomic particle strikes or electromagnetic radiation.

A shared cache may be provided which is accessible to each of the processing elements when in the split mode. However, while the shared cache may improve performance, providing a shared cache in a cluster of processing elements having both the split mode and the lock mode can create challenges in managing access to the shared cache in the respective modes. In the techniques discussed below, the shared cache has a certain predetermined cache capacity, which is accessible to each of the processing elements in the split mode. The predetermined cache capacity of the shared cache is fully accessible to the at least one primary processing element when in the lock mode. For example the full associativity of the shared cache (including all ways and all sets) may be accessible in the lock mode. This means that the performance of the primary workload on a primary processing element need not be sacrificed due to the implementation of the lock mode. This contrasts with an alternative approach in which the shared cache is divided into a portion accessible only to the primary processing element when in the lock mode and a portion accessible only to the redundant processing element when in the lock mode. This would reduce cache performance in the lock mode. Alternatively, another approach could be that redundant cache RAM cells are provided in the shared cache which are used only in lock mode and are unused in split mode, but in this case the redundant RAM cells incur extra circuit area cost in hardware and still this means that the full cache capacity provided in hardware is not accessible to each of the processing elements when in the split mode. Unlike these alternative approaches, with the shared cache having a predetermined cache capacity which is fully accessible in the split mode and lock mode, there is no need to include redundant RAM cells and the full cache performance is available in both modes.

Control circuitry may be provided, to provide the at least one redundant processing element with a response to a redundant data access request issued by the at least one redundant processing element in the lock mode, where that response is based on a cache access to the shared cache triggered by a primary data access request issued by the at least one primary processing element in the lock mode. Hence, rather than attempting to trigger cache accesses directly based on the redundant data access request itself, instead the cache access is triggered by the primary data access request and in lock mode any response received in response to the primary cache access may be forwarded to the redundant processing element as a response to the redundant data access request. This means that it is not necessary for the redundant processing element to itself issue any cache accesses, which means that it is not necessary to provide redundant RAM cells accessible only to the redundant processing element in the lock mode, or to chop the cache into portions reserved for the primary and redundant processing elements in the lock mode respectively. This means that the full cache capacity is accessible to the primary processing element in the lock mode and also accessible to each processing element in the split mode, without incurring any extra cost in redundant RAM cells or incurring the performance cost of the chopped cache.

Hence, cache accesses to the shared cache may be suppressed from being triggered in response to the redundant data access request when the lock mode, even when the redundant data access request specifies an address of data cached in the shared cache. This is because the response to such a data access request can instead be provided based on the cache access triggered in response to a corresponding primary data access request.

The redundant data access request issued by a redundant processing element in the lock mode may be compared with a corresponding primary data access request issued by a primary processing element when in the lock mode, using comparison circuitry. The comparison circuitry may signal an error when a mismatch is detected between the redundant data access request and the corresponding primary data access request, when in the lock mode. Hence, the redundant data access requests issued by the redundant processing element in the lock mode may be used simply for comparing with the primary data access request for error detection purposes rather than initiating cache accesses themselves. This contrasts with the chopped cache or redundant RAM cell approach as discussed above, where the redundant processing element would initiate its own cache access in parallel with a primary cache access initiated by the primary processing element.

The cluster of processing elements and the shared cache may be part of a data processing apparatus. All cache storage of the data processing apparatus may be accessible when in the split mode. Hence, there is no need to provide redundant RAM cells which are accessible exclusively in the lock mode.

The shared cache may be a coherent cache for which coherency is maintained with the respect to external memory and with respect to any private caches within the processing elements. Coherent interconnect circuitry may be provided to manage the coherency between the shared cache and the private caches. The coherent interconnect circuitry may operate according to a particular coherency protocol, which may govern the format of the coherency messages issued to the coherent interconnect circuitry by the processing elements and the corresponding responses to be taken to those coherency messages. The coherency messages defined in the coherency protocol may include messages for providing data access requests; messages for providing read or write responses in response to the data access request; snoop requests for checking the coherency state of data within private cache of a given processing element or for requesting that the processing element invalidates data in its private cache or returns a most up to date version of data from a given address; and/or snoop responses sent in response to these snoop requests.

To handle the lock mode, the coherent interconnect circuitry may comprise primary interconnect circuitry and redundant interconnect circuitry. The primary interconnect circuitry may include control logic for managing the coherency between the respective processing element and the shared cache when in the split mode. The redundant interconnect may mirror the functionality of the primary interconnect circuitry, with equivalent circuit elements to the primary connect circuitry, for checking that the primary interconnect circuitry is functioning correctly when the system is operating in the lock mode.

When the system is operating in the split mode, the primary interconnect circuitry may exchange coherency messages with each of the processing elements of the cluster, and the redundant interconnect circuitry may be inactive.

On the other hand, in the lock mode, the primary interconnect circuitry may receive coherency messages from the at least one primary processing element, and transmit coherency messages to the at least one primary processing element. The coherency messages received from the at least one primary processing element may also be provided to the redundant interconnect circuitry, so that the redundant interconnect circuitry can check whether the processing of these coherency messages by the primary interconnect circuitry has been performed correctly. However, in the response to those coherency messages, outgoing coherency messages from the redundant interconnect circuitry may be transmitted to the at least one redundant processing element, rather than being transmitted to the at least one primary processing element. Hence, for the redundant interconnect circuitry, when an incoming coherency message from the primary processing element requires a response, the corresponding outgoing coherency message sent in response to that incoming coherency message is sent to the corresponding redundant processing element, not the primary processing element which sent the original incoming coherency message. This allows the redundant processing element to perform the appropriate action in response to the outgoing coherency message transmitted by the redundant interconnect circuitry, to emulate the corresponding processing which would be performed at the primary processing element in response to a corresponding outgoing coherency message transmitted from the primary interconnect circuitry, so that the primary and redundant processing elements can continue to function in lockstep when in the lock mode.

Hence, routing control circuitry may be provided to select whether coherency messages provided to a given redundant processing element are obtained from the primary interconnect circuitry (when in the split mode) or from the redundant interconnect circuitry (when in the lock mode).

Part of the functionality of the interconnect circuitry may be to determine when memory access requests have to be issued to a shared cache or downstream memory, based on coherency messages received from a processing element. In the split mode this functionality may be performed by the primary interconnect circuitry.

In the lock mode, the primary interconnect circuitry may issue a primary memory access request to the shared cache or downstream memory in response to a coherency message from the at least one primary processing element. The redundant interconnect circuitry may, in the lock mode, issue a corresponding redundant memory access request in response to the coherency message received from the at least one primary processing element. However, this redundant memory access request does not actually trigger an access to the shared cache or downstream memory. Instead, the coherent interconnect circuitry includes comparison circuitry to signal an error when a mismatch is detected between the primary memory request and the redundant memory access request. Hence, the comparison circuitry provides a check of whether the control logic in the primary interconnect circuitry and redundant interconnect circuitry encountered any error.

In the lock mode, the primary interconnect circuitry may transmit a coherency message to the at least one primary processing element based on a response to the primary memory access request received from the shared cache or downstream memory. The redundant interconnect circuitry may also be provided with any response to the primary memory access request received from the shared cache or downstream memory, and may then also transmit a coherency message to the at least one redundant processing element based on the received response from the shared cache or downstream memory. Hence, while the redundant memory access request issued by the redundant interconnect circuitry did not itself initiate a cache access, the redundant interconnect circuitry nevertheless receives the response to the primary access request initiated by the primary interconnect circuitry, so that an outgoing coherency message can be provided to the at least one redundant processing element to keep that redundant processing element in lock step with the corresponding primary processing element (which would be expected to receive a corresponding outgoing coherency message from the primary interconnect logic).

As mentioned above, the coherency protocol may also define at least one type of snoop request which may be used by the interconnect to query the coherency state of data cached in a private cache of a given processing element, to trigger a certain transition in coherency states within a private cache of a given processing element (e.g. triggering an invalidation, cleaning or write back of data in the private cache), or to trigger the private cache of the processing element to return the value held for a given address. Such snoop requests may be issued by the interconnect in response to data access requests issued by other processing elements. For example, if one processing element issues a data access request which requests that data is returned in an exclusive coherency state, then this may require any corresponding copies of data from the same address held in other processing elements' caches to be invalidated.

Hence, in the split mode, in response to a data access request issued by a given processing element, the primary interconnect circuitry may transmit one or more snoop requests to at least one other processing element of the cluster. In some cases the snoop request may be issued to all other processing elements of the cluster. However, it is also possible for the interconnect to implement a snoop filter which may at least partially track which data is held in private caches of the processing element of the cluster, and if the snoop filter indicates that a certain processing element does not currently hold data for the relevant address within its private cache, then it is not necessary to transmit a snoop request to that particular processing element.

In the lock mode, in systems which have two or more primary elements and corresponding two or more redundant processing elements, when a data access request is issued by a given primary processing element, the primary interconnect circuitry may transmit a snoop request to at least one other primary processing element. Also, in response to the data access request issued by a given primary processing element, the redundant interconnect circuitry may transmit a snoop request to at least one redundant processing element. The control decisions which are taken to decide whether to issue the snoop request in response to the data access request may be the same in the primary and redundant interconnect circuitry, when there is no error. In the lock mode, a given pair of primary and redundant processing elements would be expected to receive corresponding primary and redundant snoop requests, and these can be compared by comparison logic to determine whether there is a mismatch in the snoop request and if there is a mismatch then an error can be signalled.

The primary interconnect circuitry may have a number of processing element interfaces, each for exchanging coherency messages with a corresponding processing element when in the split mode. In the lock mode, half the processing element interfaces may be made active and these correspond to the at least one primary processing element, while those processing element interfaces which correspond to redundant processing elements may be made inactive. Snoop requests need not be issued over any of the inactive processing element interfaces by the primary interconnect circuitry.

In a corresponding way, the redundant interconnect circuitry may have a number of processing element interfaces to mirror the corresponding processing element interfaces of the primary interconnect circuitry. In the split mode, the redundant interconnect circuitry is entirely inactive. In the lock mode, half of the processing element interfaces of the redundant interconnect circuitry may be active, and may receive their incoming coherency messages from a corresponding primary processing element, but output their outgoing coherency messages to a corresponding redundant processing element.

However, the other half of the processing element interfaces of the redundant interconnect circuitry may be inactive in both the split mode and the lock mode. One may think that it would be a waste of circuit area to instantiate processing element interfaces in the redundant interconnect circuitry which will always be inactive. However, in practice by fully replicating each of the interfaces of the primary interconnect circuitry in corresponding interfaces of the redundant interconnect circuitry, even though half the interfaces will never be used in the redundant interconnect circuitry, this allows the redundant interconnect circuitry to exactly replicate timing delays in the primary processing element, which can be useful for ensuring that the primary and redundant processing elements execute in lockstep with a fixed time offset between the primary and redundant processing workloads. Hence, at least one of the processing element interfaces of the redundant interconnect circuitry may be inactive in both the split mode and the lock mode, but may nevertheless be instantiated in hardware.

In some examples, the time offset between processing of the primary processing workload on a primary processing element and processing of a redundant processing workload on a redundant processing element may be zero, so that the primary and redundant processing elements operate exactly in parallel.

However, in other examples it can be useful to provide a non-zero time offset so that the processing of the redundant processing workload on the redundant processing element is delayed relative to the processing of the primary workload on a corresponding primary processing element, by a particular time offset. Providing such non-zero time offset is useful because it reduces susceptibility of both the primary and redundant processing workloads encountering the same error in response to some external action such as interference by a particle strike. Hence operating with a non-zero offset can improve robustness against errors and reduce the chance that an error remains undetected because both the primary and redundant processing workloads encountered the same error.

In the examples discussed below, a single redundant processing element is provided for each primary processing element in the lock mode, so that a dual-core lock step approach is used. The techniques discussed in this application could also be implemented in a triple core lock step system where each primary processing element corresponds to two redundant processing elements which both perform the same redundant processing workload for checking the outcome of the primary processing workload. This would allow errors to be corrected by selecting the majority output generated by two of the three processing elements in the redundant set. The primary element in the lock mode can still have full access to the full cache capacity of the shared cache in both split mode and lock mode and without the need for extra redundant cache RAMs used only in lock mode.

Figure 1:
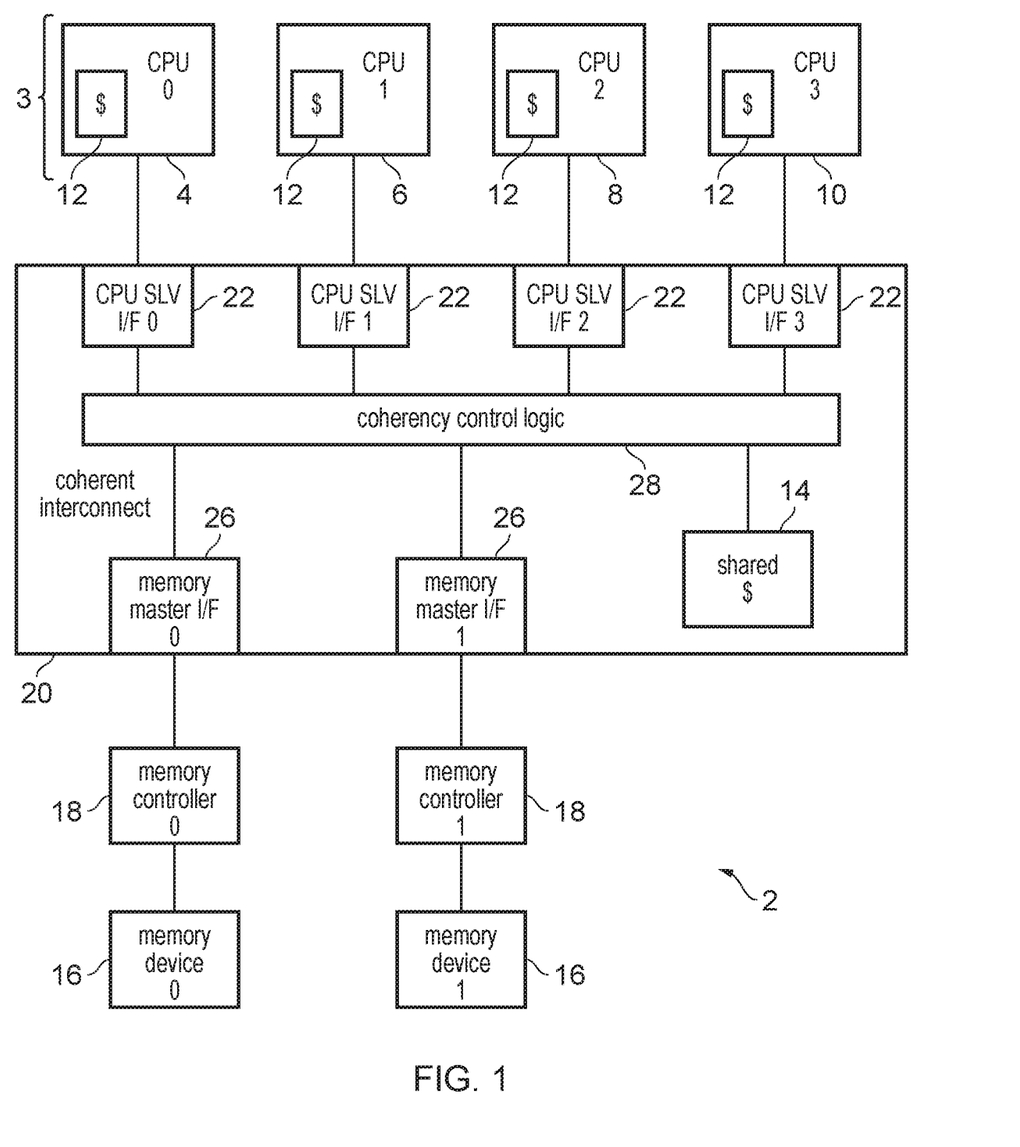
FIG. 1 shows an example of a cache coherent multi-processor cluster.

FIG. 1 schematically illustrates an example of a multiprocessor system 2 which comprises a cluster 3 of processing elements 4, 6, 8, 10. In this example there are four processing elements (CPUs) in the cluster. Each processing element may have its own private cache 12. Each of the processing elements 4, 6, 8, 10 shares access to shared memory, including access to a shared cache 14 and to one or more memory devices 16, which could be on-chip memory on the same integrated circuit as the processor cluster 3 or off-chip memory on a different integrated circuit. The memory devices 16 could be volatile or non-volatile memory. Each memory device 16 has a corresponding memory controller 18 for controlling access to the memory.

A coherent interconnect 20 is provided to manage coherency between data in the private caches 12 of the respective processor cores of the cluster 3 and data in the shared cache 14 and downstream memory 16. The coherent interconnect 20 includes a number of processing elements (slave) interfaces 22, each corresponding to one of the processor elements 4-10 in the cluster 3. Each processing element slave interface 22 exchanges coherency messages with a corresponding processing element 4-10 of the cluster 3. The coherent interconnect 20 also includes the shared cache 14, and one or more memory master interfaces 26 for issuing memory access requests to the memory devices 16 and receiving corresponding responses. The processing element interfaces 22 are called slave interfaces because they act as a slave to the master devices of the processing elements in the coherency protocol being used, and similarly the memory master interfaces 26 are considered master interfaces as they act as the master in the master-slave relationship between master interface 26 and the corresponding memory controller 18.

The coherent interconnect 20 has coherency control logic 28 for controlling the processing of coherency messages received at the processing element interfaces 22 and deciding how to respond to those coherency messages, whether by issuing other coherency messages (snoop requests) to other processing elements 4, 6, 8, 10 over the slave interfaces 22, or by issuing a memory access request to the shared cache 14 or to memory 16 over the master interfaces 24, 26. The definition of the coherency messages and memory access requests, and rules for deciding what response should be taken to particular types of messages, may be defined in a coherency protocol, such as the AMBA® protocol provided Arm® Limited of Cambridge, UK. This is just one example of a coherency protocol and many other coherency protocols could also be used.

Figure 2:
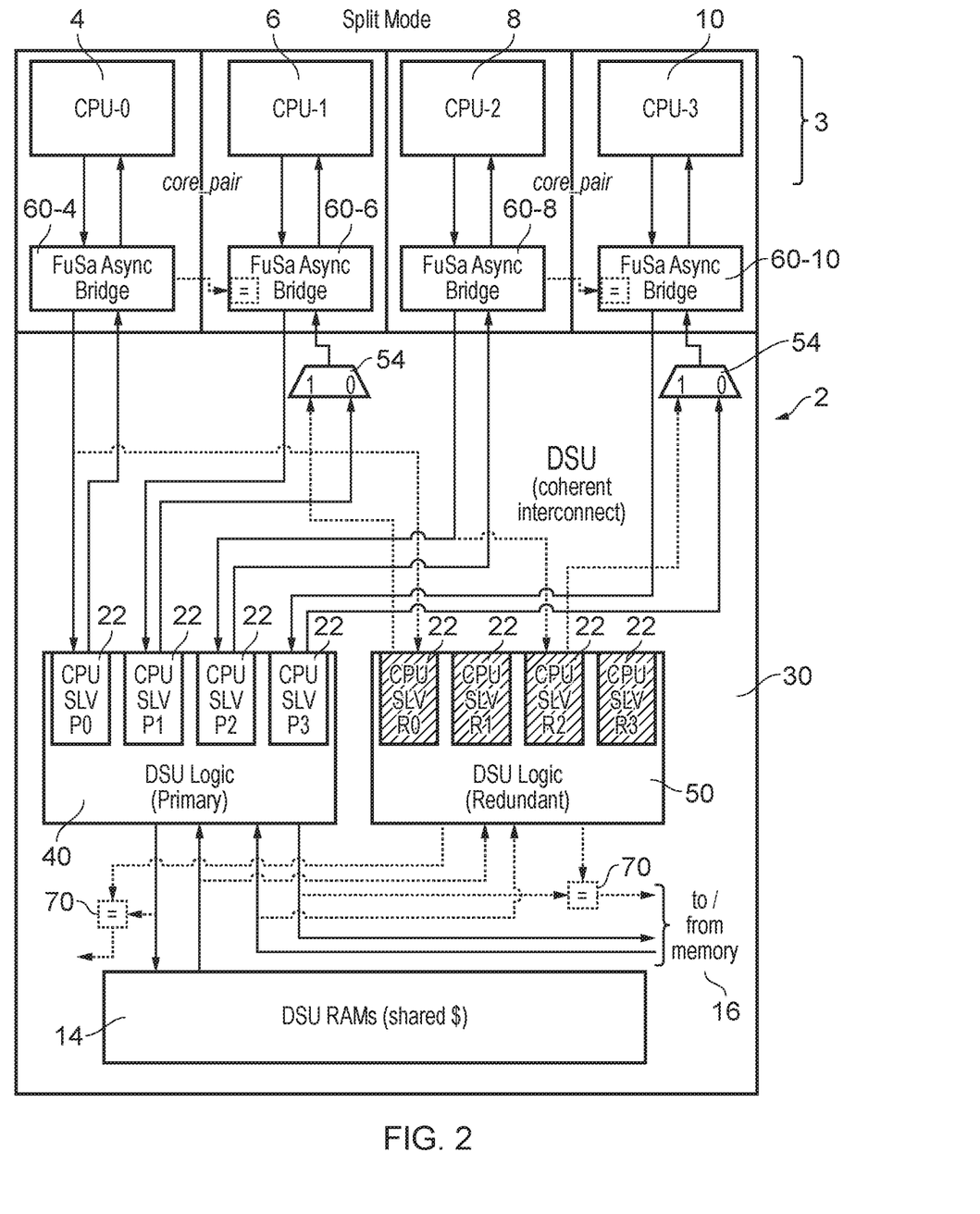
FIG. 2 shows an example of a cache coherent multi-processor cluster when operating in a split mode.

FIG. 2 illustrates how such a coherent multi-core system can be expanded to support a split mode and lock mode, to allow error detection for functional safety. The coherent interconnect 20 is replaced with a coherent interconnect 30, also known as a DSU (Dynamic Shared Unit). The DSU 30 comprises primary interconnect (DSU) logic 40 and redundant interconnect (DSU) logic 50, as well as the shared cache 14. The primary and redundant DSU logic are each configured similar to the coherent interconnect 20 shown in FIG. 1, in that they include a number of processing element interfaces 22 (the same number as the number of processor cores 4 to 10 in the cluster 3), and although not illustrated in FIG. 2 for conciseness, the primary and redundant logic 40, 50 each also include the coherency control logic 28 and the memory master interfaces 26. For both the primary interconnect logic 40 and the redundant interconnect logic 50, the response taken to requests received at a certain processing element interface 22 is the same as in the example of FIG. 1, as defined by the relevant coherency protocol. Hence, the primary or redundant logic 40, 50 may choose to issue snoop requests to other processing elements 4-10 over processing element interfaces 22 other than the requesting interface which received the corresponding data access request which initiated the snoop, and/or may issue memory access requests to the shared cache 14 or to memory 16.

The coherent interconnect 30 also includes routing control circuitry 54 which is used to select whether coherency messages transmitted by the primary or redundant interconnect logic 40, 50 are transmitted to certain processing elements 6, 10 of the cluster 3. Also, in the system 2 shown in FIG. 2, each processing element 4 to 10 is provided with a functional safety (FuSa) asynchronous bridge 60 on the request/response path between the processing element and the coherent interconnect 30.

FIG. 2 shows the configuration of the system 2 when in the split mode, in which each of the processing elements 4, 6, 8, 10 may process an independent processing workload, separate from any processing workloads processed on other processing elements. In the split mode, the bridge 60 for a given processing element passes any requests issued by that processing element to the interconnect 30 and passes any messages received from the interconnect to that processing element.

Within the interconnect 30, in the split mode the primary interconnect logic is active and the redundant interconnect logic 50 is inactive. The processing element interfaces 22 of the primary interconnect logic 40 exchange coherency messages with respective processing elements of the cluster. Hence the interfaces 22 marked P0 to P3 in the primary interconnect logic 40 exchange coherency messages with processing elements 0 to 3 within the cluster 3. The routing control circuitry 54 selects the coherency messages issued by interfaces P1 and P3 for issuing to CPUs 1 and 3 respectively, and does not select the alternate path from the redundant interconnect logic 50 when in the split mode.

Hence, when in the split mode, data access requests issued by any of the processing elements 4 to 10 may trigger the primary interconnect logic 40 to initiate a memory access request to the shared cache 14, and the full capacity of the shared cache 14 may be accessible to all of the processing elements when in the split mode. The shared cache 14 may have a certain associativity (number of alternative cache entries at which data from a given address may be placed in the cache). All of the shared cache capacity and associativity within the data processing system 2 is accessible in the split mode. There are no unused cache RAMs reserved for lock mode only.

Figure 3:
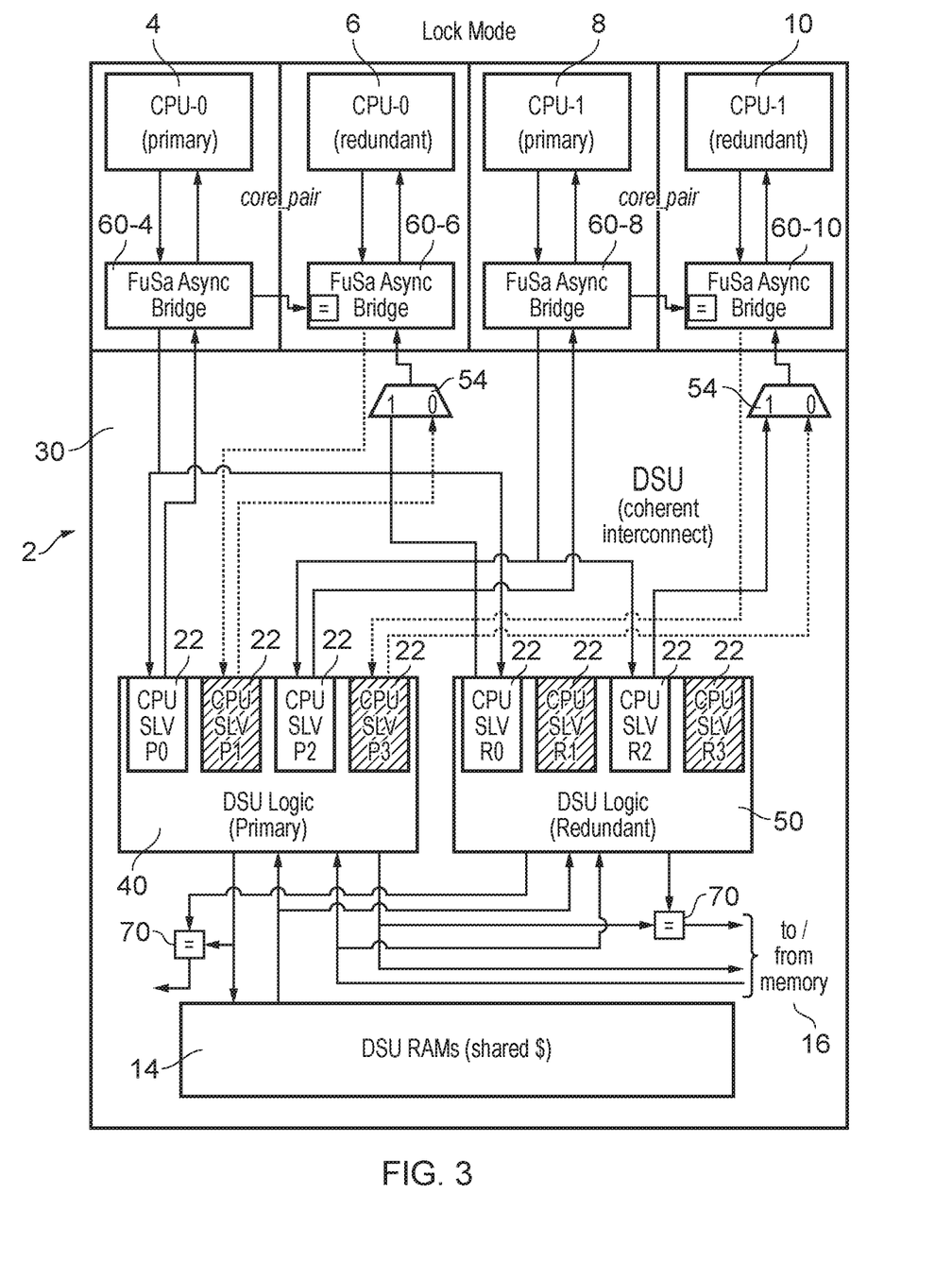
FIG. 3 shows an example of the cluster when operating in a lock mode.

FIG. 3 shows an alternative configuration of the apparatus 2 shown in FIG. 2 when operating in the lock mode. In the lock mode, the processing elements 4 to 10 are divided into a number of pairs of elements, each pair including a primary processing element and a redundant processing element. For example, processing element 4 is a primary element and processing element 6 is a corresponding redundant processing element which executes a redundant workload which mirrors the primary workload on the primary processing element 4, so that errors in operation in either of the primary and redundant cores 4, 6, can be checked. Similarly, processing elements 8 and 10 are another pair of primary and redundant elements, with processing element 8 being the primary element and processing element 10 being the redundant processing element.

In the lock mode, in addition to passing any data access requests issued by the primary processing element to the interconnect 30, the bridge 60-4, 60-8 corresponding to a primary processing element 4-8 also forwards the data access request issued by the primary processing element to the bridge 60-6, 60-10 associated with the corresponding redundant processing element 6, 10 in the same pair of elements. Meanwhile the redundant workload on the corresponding redundant element of the pair will be expected to issue a corresponding data access request, which can be compared against the primary data access request by the functional safety bridge 60-6, 60-10 associated with the redundant processing element, to detect whether there is a mismatch between the primary and redundant memory accesses. If there is such a mismatch, then the bridge 60-6, 60-10 for the redundant processing element signals that an error has occurred. This may trigger some response to be taken, such as execution of an exception handler, resetting operation to a known state, or reporting an error to the user such as by activating a light on a display panel or an audible warning.

Also, any snoop requests received by the bridge 60-4, 60-8 for a primary processing element 4, 8 may be transmitted to the corresponding bridge 60-6, 60-10 for the redundant processing element 6, 10 in the same pair, and then the bridge 60-6, 60-10 for the redundant processing element 6, 10 may compare the primary snoop request received from the bridge 60-4, 60-8 for the primary processing element with the redundant snoop request received for the redundant processing element 6, 10, and signal an error if there is a mismatch.

In the lock mode, the redundant interconnect logic 50 within the coherent interconnect 30 is activated. In the primary interconnect logic 40, the processing element interfaces 22 which correspond to primary processing elements 4, 8 are active (e.g. interfaces P0 and P2 in the example of FIG. 3). The processing element interfaces 22 (P1, P3) of the primary interconnect logic 40 which in the split mode correspond to redundant processing elements 6, 10, are made inactive in the lock mode.

In a similar way, in the redundant interconnect logic 50 the processing element interfaces 22 which correspond in position to the active interfaces 22 of the primary logic are made active. That is, interfaces R0 and R2 are active in the example of FIG. 3. The other processing element interfaces R1 and R3 of the redundant processing logic are inactive. Note that these processing element interfaces R1 and R3 are always inactive in both the split mode and the lock mode, but are nevertheless provided in hardware so that the timing delays through the redundant interconnect logic can mirror the expected delays in the primary interconnect logic. Also, this approach simplifies system developments since a verified design for the coherent interconnect 20 in a system not supporting split mode or lock mode can be reused as both the primary and redundant interconnect logic 40, 50, which may require less circuit verification effort, reducing development costs.

In the split mode, coherency messages issued by the primary processing elements 4, 8 are issued to corresponding processing element interfaces in both the primary and redundant interconnect logic 40, 50. For example the coherency messages issued by primary processing element 4 are issued both to interface P0 in the primary interconnect logic 40 and to the corresponding interface R0 in the redundant interconnect logic 50. Similarly, the coherency messages from core 8 are issued to both interfaces P2 and R2 in the primary and redundant interconnect logic 40, 50 respectively. The functional safety bridge 60 for the redundant processing element intercepts any coherency messages issued by the redundant processing element 6, 10 and stops them from being transmitted to the interconnect 30, and so none of the interfaces 22 in either the primary or the redundant logic 40, 50 receive any coherency messages from redundant processing element 6, 10.

Hence, the incoming coherency message channels for the processing element interfaces P0, P2, R0, R2 are each connected to the signal path for a corresponding primary element 4, 8 and the coherency messages issued by particular primary element 4 are duplicated to both the corresponding primary and redundant interfaces.

However, in the lock mode, for the outgoing coherency messages issued by the interconnect to the processing element, the corresponding primary and redundant interfaces 22 issue their coherency messages to different processing elements. The interfaces P0, P2 in the primary interconnect logic 40 issue their outgoing coherency messages to the bridge 60-4, 60-8 associated with corresponding primary processing elements 4, 8, while the corresponding redundant processing element interfaces R0, R1 in the redundant interconnect logic 50 issue their outgoing coherency messages via the routing control circuitry 54 to the bridges 60-6, 60-10 associated with the corresponding redundant processing elements 6, 10. Hence, the routing control circuitry 54 selects to provide redundant processing elements with responses generated by the redundant interconnect logic 50 instead of the primary interconnect logic 40.

Hence, for a data access request coherency message issued by the primary processing element 4, 8 when sent to the redundant interconnect logic 50 this may trigger the coherency control logic 28 of the redundant interconnect logic so to generate an access request to the shared cache 14 or memory 16. When a response is received, a corresponding outgoing coherency message which provides the response to that access request may be sent by the redundant interconnect logic 50 to a different processing element to the processing element which issued the coherency message which triggered that access request, since the response may be provided to a redundant processing element 6, 10 instead of the corresponding primary processing element 4, 8. Such responses may be checked by the functional safety bridge 60 against the corresponding response received by the primary processing element 4, 8 from the primary interconnect logic 40, to check that neither the primary or redundant interconnect circuitry 40, 50 has malfunctioned.

In the lock mode, memory access comparison circuitry 70 is activated, which is inactive in the split mode. On both the path for issuing memory access requests to the shared cache 14 and the path for issuing memory access requests to the memory 16, a comparator 70 may be provided to receive corresponding primary and redundant memory access requests triggered by the primary and redundant interconnect logic 40, 50. The comparison circuitry 70 compares the primary and redundant memory access requests and signals an error if a mismatch is detected between these requests. Only the primary memory access requests are provided to the shared cache 14 or to memory 16. The redundant memory access requests are issued by the redundant interconnect circuitry 50 for the purpose of comparing against the primary memory access requests, but do not themselves initiate a cache access or a memory access.

When a response is received to the primary memory access request from the shared cache 14 or memory 16, then this response is provided to both the primary and redundant interconnect logic 40, 50, which then formulates the corresponding outgoing coherency message which can be issued to the respective processing elements over interfaces P0, P2, R0, R2 as appropriate.

With this approach, the full cache capacity of the shared cache 14 and related associativity of the shared cache 14 can be provided to all of the processing elements 4 to 10 in the cluster 3 regardless of which mode (split mode or lock mode) has been selected for operating the cluster 3. There are no unused RAM cells in the shared cache 14 which are reserved exclusively for split mode or lock mode. Instead the full performance of the cache can be exploited in the lock mode and in the split mode. The shared cache memory 14 supports fully coherent interconnectivity regardless of mode of operation, and the cluster remains coherent to external memory in the lock mode as well as in the split mode.

This contrast with alternative approaches which may either utilise redundant RAM cells which are unused in split mode, or may use a chopped cache which splits the capacity of the shared cache 14 between resources in the lock mode. Either way, these alternative approaches may not make the full cache capacity and the associativity (e.g. number of ways) available to the CPU resources in both split and lock modes. This means that either hardware costs increase due to unused cache RAM in the split mode, or there is reduced cache performance in the lock mode.

Hence, in the lock mode, the technique shown in FIG. 3 leverages the slaves in the redundant interconnect logic 50 to independently manage the cache access requests to the shared cache 14, separate from the primary cache access request issued by the primary interconnect circuitry 40. The redundant cache access requests are compared against the primary cache access requests, but only the primary access requests are issued to the shared cache. The cache outputs are returned to both the primary and redundant interconnect logic 40, 50 so that the coherent interconnect logic remains in lock step and can provide appropriate responses to both the primary and redundant CPU's 4, 6, 8, 10. In split mode the redundant interconnect circuitry 50 is gated off to save power and all the requests and responses provided by the processing elements are routed via the primary interconnect logic 40. Because the shared cache 14 in the coherent interconnect 30 is essentially controlled by the primary interconnect logic 40, the CPUs 4-10 always see the entire capacity and associativity of the shared cache 14 and there are no unused redundant memories in split mode or cache chopping in lock mode. This solution is architected to be entirely cache coherent with respect to external memory and with respect to the private caches 12 in the individual cores 4-10 regardless of which mode of operation is being used for the cluster.

While the example in FIGS. 2 and 3 shows a cluster with four processor cores, that can be configured as a four-core multi-processor in the split mode or a two-core multi-processor in lock step in the lock mode, other examples could have fewer or greater number of processing cores in the cluster 3. For example some examples could only have two cores in the cluster, with both cores operating independently in split mode and the cores acting as a primary and redundant core in lock mode. Other examples may have more than two pairs of processing elements, each pair including one primary element and one redundant processing element. Nevertheless, in both split mode and lock step mode the shared cache 14 is entirely shared even when some of the redundant interconnect logic 50 is gated off.

The functionality of various parts of the system 2 shown in FIGS. 2 and 3 in the respective lock and split modes is now described with respect to the flow diagrams in FIGS. 4 to 8.

Figure 4:
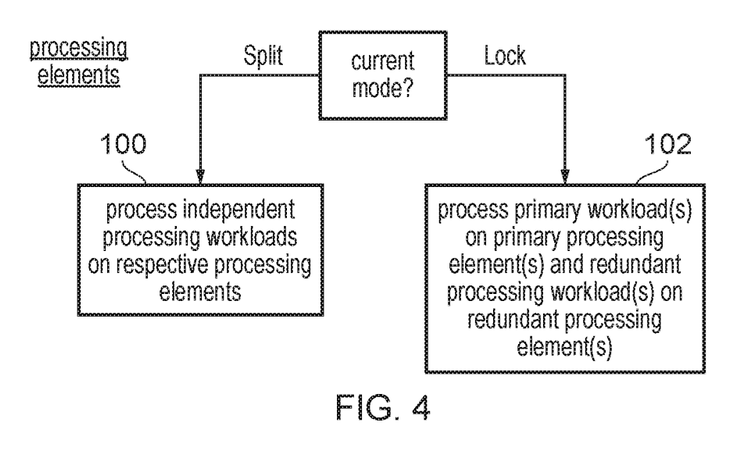
FIG. 4 is a flow diagram showing a method of operating the processing elements in the split and lock modes respectively.

FIG. 4 shows a functionality in the processing elements themselves. In the split mode, independent processing workloads are performed on the respective processing elements 4 to 10 of the cluster 3 (see step 100 of FIG. 4). It is not essential to execute workloads on all of the processing elements during the split mode. It is possible for at least one processing element to be inactive in the split mode.

On the other hand in the lock mode, at step 102, the processing elements are divided into pairs with each pair having one primary processing element 4, 8 and one redundant processing element 6, 10. Primary processing workloads are performed on the primary processing elements 4, 8 and redundant processing workloads (each identical to a respective primary processing workload) are performed on the redundant processing elements 6, 10. Note that one pair of primary/redundant processing elements may be performing a different processing workload to another pair of primary/redundant processing elements.

Whether the current mode is the split mode or the lock mode can be selected statically or dynamically. The mode of operation could be statically configured for a given processing system, for example by hard wiring or fusing certain configurable storage elements to permanently indicate that the system should operate in one of the split mode or the lock mode. This would allow the mode to be used for a particular hardware device to be selected during manufacturing, but nevertheless allows the same overall processor design to be used on a range of applications which may either require split mode or lock mode. Alternatively, the mode could be dynamically configurable, for example based on boot data which is loaded at reset. For example, a system which is to be used in an automotive vehicle for controlling safety-critical systems such as braking or steering, or a processing system designed for space-based applications based in a satellite or spacecraft could be configured to use the lock mode, to provide additional functional safety and/or protection against increased likelihood of interference from sub-atomic particles or electromagnetic radiation when located outside the protection of the Earth's atmosphere.

Figure 5:
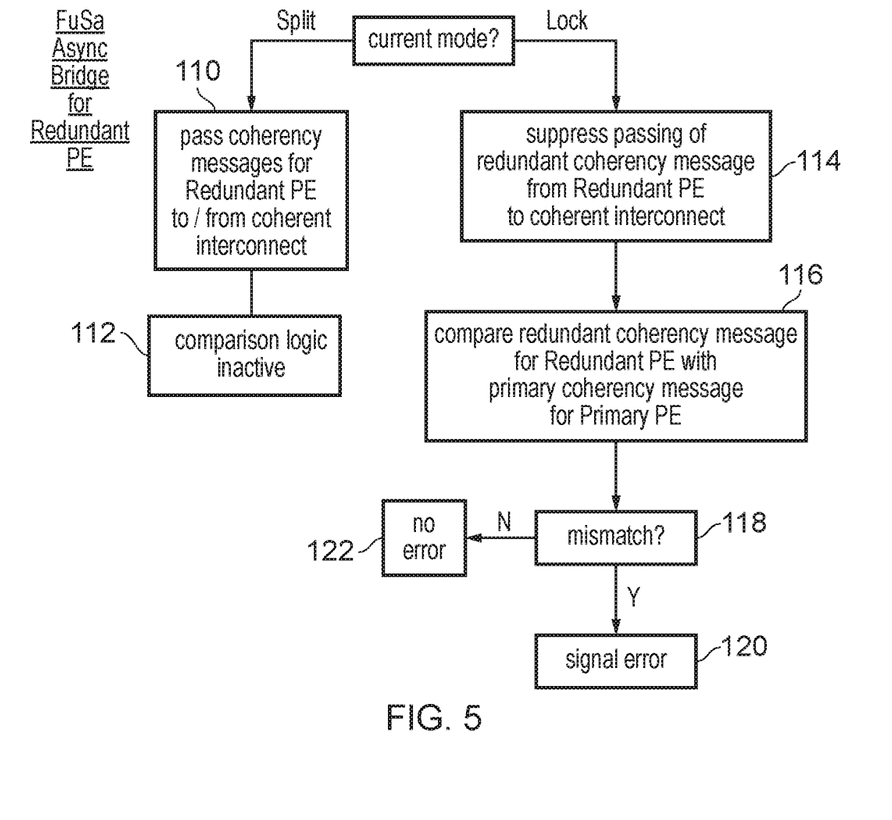
FIG. 5 is a flow diagram showing functions of a functional safety asynchronous bridge corresponding to a redundant processing element, when in the split and lock mode.

FIG. 5 is a flow diagram showing functionality of the functional safety asynchronous bridge 60-6, 60-10 corresponding to a given redundant processing element 6, 10 of the cluster 3. If the current mode is the split mode then at step 110 the bridge 60-6, 60-10 simply passes coherency messages from the redundant processing elements 6, 10 to the coherent interconnect 30 and any comparison logic for comparing the coherency messages against corresponding messages generated by the primary processing elements 4, 8 is made inactive.

On the other hand, in the lock mode, at step 114 the bridge 60-6, 60-10 for the redundant processing 6, 10 suppresses passing of the redundant coherency message from the redundant processing element 6, 10 to the coherent interconnect 30. While coherency messages from the processing element 6, 10 to the interconnect 30 are suppressed, the bridge 60-6, 60-10 still allows coherency messages received from the coherent interconnect 30 to be transmitted to the redundant processing element 6, 10 in the lock mode.

Also, in the lock mode at step 116 any redundant coherency message issued by or to the redundant processing element 6, 10 is compared with a corresponding primary coherency message received from the bridge 60-4, 60-8 for the corresponding primary processing element 4, 8. This applies both to redundant coherency messages sent by the processing element 6, 10 to the interconnect 30 and to the coherency messages received from the interconnect 30 to be transmitted to the redundant processing element. In both cases, a corresponding coherency message will be received from the bridge 60 associated with the corresponding primary processing element 4, 8, and this can be compared with the redundant coherency message to determine whether is a mismatch (step 118). If a mismatch is detected then at step 120 an error is signalled and the coherency message is prevented from being forwarded to its destination, while if the redundant and primary coherency messages are the same then at step 122 it is determined not to signal an error, and the message is allowed to reach its destination. Hence, the comparison of the coherency messages issued by the primary and redundant processing elements in the same pair allow for detection of errors in operation within the processing element 4, 6 itself, while the comparison of the coherency messages received from the interconnect 30 for the primary and redundant processing elements allows the operation of the primary and redundant interconnect logic 40, 50 to be checked for errors.

For the functional safety bridges 60-4, 60-8 corresponding to primary processing elements 4, 8, in both split mode and lock mode, coherency messages issued by the corresponding processing element 4, 8 are passed onto the coherent interconnect 30, and coherency messages received from the coherent interconnect 30 are passed to the corresponding processing element 4, 8.

Figure 6:
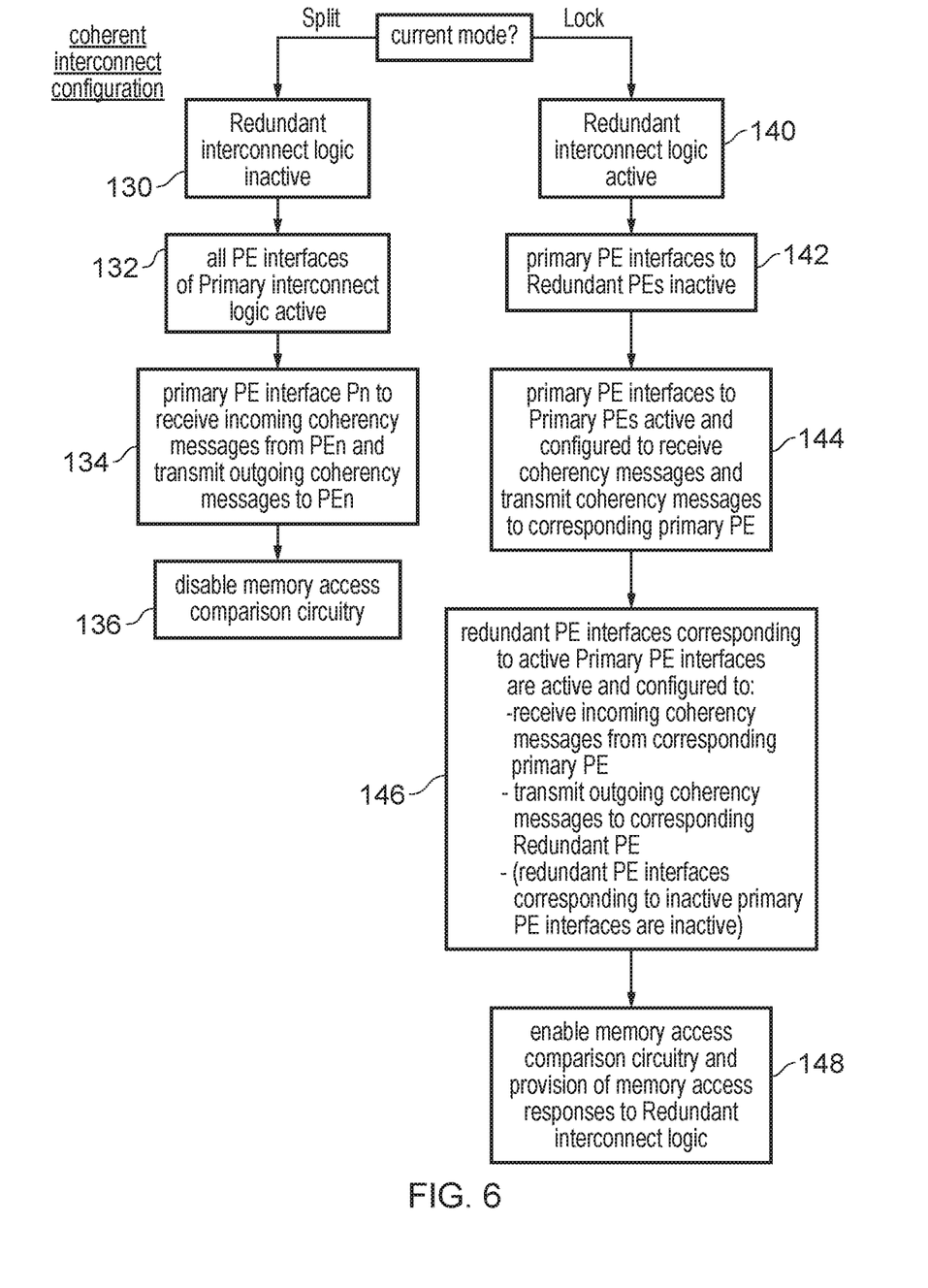
FIG. 6 shows a flow diagram showing a method of configuring a coherent interconnect based on the split mode or the lock mode.

FIG. 6 is a flow diagram showing the configuration of the coherent interconnect 30 within the split mode and lock mode. In the split mode, at step 130 the redundant interconnect logic 50 is made inactive (e.g. by power gating or clock gating) and at step 132 all the processing element interfaces 22 of the primary interconnect logic are made active. At step 134 the routing control is configured such that for any given primary processing element interface Pn (where n is 0 to 3 in the example of FIG. 2) the interface Pn receives the incoming coherency messages from processing element n and transmits the outgoing coherency messages to processing element n. For example interface P0 in the example of FIG. 2 exchanges coherency messages (in both directions) with CPU 0 (processing element 4).

Also, in the split mode, at step 136 the memory access comparison circuitry 70 is disabled and instead any cache access requests or memory access requests to either the shared cache 14 or memory 16 are issued without comparison with redundant versions of the same requests.

On the other hand, in the lock mode, at step 140 the redundant interconnect logic 50 is made active, by disabling any power gating or clock gating that would be applied in the split mode, and at step 142 in the primary interconnect logic 40, the primary processing element interfaces P1, P3 which in the split mode would correspond to redundant processing elements 6, 10 are made inactive. At step 144 the processing element interfaces P0, P2 of the primary interconnect logic 40 which corresponds to the primary processing elements 4, 8 remain active and are configured to receive incoming coherency messages from the corresponding primary processing elements and transmit outgoing coherency messages to the corresponding primary processing elements.

At step 146 those redundant processing element interfaces R0, R2, which correspond to active primary processing element interfaces P0, P2 in the primary interconnect logic 40, are made active. These active redundant processing element interfaces R0, R2 are each configured to receive incoming coherency messages from a corresponding primary processing element 4, 8, but transmit outgoing coherency messages to a corresponding redundant processing element 6, 10. That is, in the lock mode, the routing control circuitry 54 switches state to select the messages issued by interfaces R0, R2 respectively, instead of selecting the messages from interfaces P1 and P3 of the primary interconnect logic 40 as in the split mode. The other redundant processing element interfaces R1, R3 which correspond to inactive processing element interfaces P1, P3 in the primary logic 40 are also inactive. These redundant processing element interfaces R1, R3 are inactive in both split mode and lock mode.

At step 148 the coherent interconnect 30, when in the lock mode, activates the memory access comparison circuitry 70 and also activates the signal paths which provide the memory access responses received from the shared cache 14 or memory 16 to the redundant interconnect logic 50.

Figure 7:
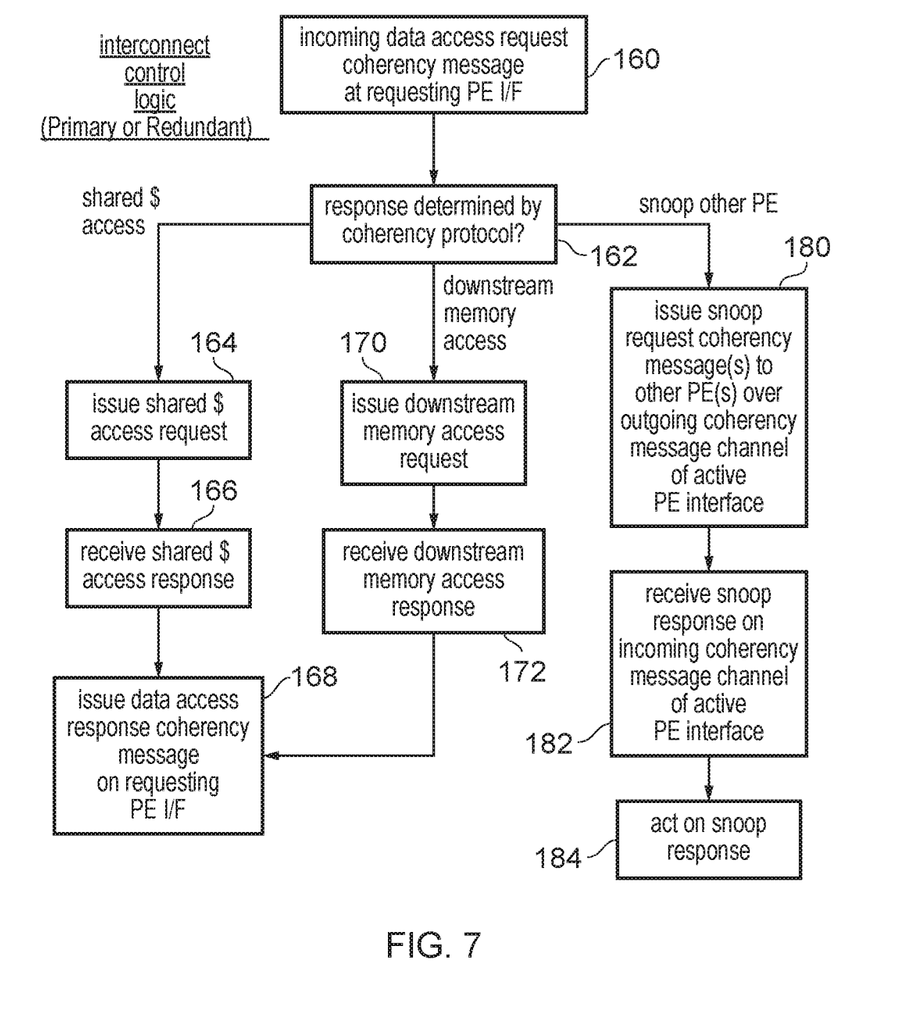
FIG. 7 is a flow diagram showing functionality of interconnect control logic.

FIG. 7 is a flow diagram showing functionality of the coherency control logic 28 within the primary or redundant interconnect logic 40, 50. This operation may be the same regardless of whether the system is in the split mode or lock mode (although the redundant logic 50 only functions in the lock mode). At step 160 the interconnect logic 40 or 50 receives an incoming data access request coherency message requesting access to data at a given address. This request is received at a particular one of the interfaces 22, which is referred to as a requesting processing element interface. At step 162 the coherency control logic 28 determines how to respond to this message, depending on the coherency protocol adopted and on any internal state held by the coherent interconnect 30, such as snoop filter information which may track which addresses are held in private caches of the processing elements 4 to 10 or within the shared cache 14. If it is determined that the data access request message requires access to the shared cache, then at step 164 the interconnect logic 40, 50 issues a shared cache request. If in the lock mode, when the method of FIG. 7 is being performed by the redundant logic 50, then the shared access request will not actually trigger access to the shared cache 14, but is compared against corresponding shared cache access requests from the primary logic 40. In both the split mode and the lock mode, shared cache access requests issued by the primary logic 40 are provided to the shared cache 14.

At step 166 a shared cache access response is received from the shared cache 14. In the split mode this will be provided only to the primary interconnect logic 40 but in the lock mode the response may be provided to both the primary and the redundant logic 40, 50. At step 168 the relevant interconnect logic 40, 50 issues a data access response coherency message on the requesting processing element interface which received the data access request at 160. However, note that for the redundant interconnect logic 50, this response coherency message will actually be routed to a different processing element to the one which issued the data access request which was received at the requesting processing element interface at step 160, as the response will go to a redundant processing element rather than the primary element which issued the data access request.

Alternatively, if at step 162 it was determined that the response to the data access request required an access to downstream memory 16, then corresponding steps 170, 172 to issue a downstream memory access request and receive a response may be performed in a similar way to steps 164, 166 for the shared cache, and then at step 168 a response coherency message may be issued by the requesting processing element interface 22 in the same way as for the shared cache access.

For some data access requests, the coherency protocol may require that other processing elements may be snooped to check the coherency data held in the private cache 12 of that processing element or to trigger a change of coherency state or return of data from the private cache 12. This snooping may occur in additional to any shared cache or memory access, or may occur without access to the shared cache or memory. If a snoop request is required then at step 180 the relevant interconnect logic 40, 50 issues an outgoing snoop request coherency message to another processing element over a different processing element interface 22 from the requesting processing element interface which receives the data access request at step 160. For any inactive processing element interfaces 22, no snoop request is sent over that interface. Some snoop requests to other processing elements may be filtered based on tracking information held in a snoop filter by the coherent interconnect 30, which may allow a determination that snoop requests to a given processing element is not necessary if the snoop filter indicates that that processing element does not hold the relevant data for the address specified by the incoming data access request received at step 160. Such a snoop filter may be duplicated in the primary and redundant interconnect logic 40, 50 respectively, so the operation of the snoop filter can be checked for errors.

When an outgoing snoop request is issued at step 180, then at step 182 a corresponding snoop response may be received on the incoming coherency message channel of the active processing element interface 22 along which the corresponding snoop request was issued. Again, note that in the lock mode, the snoop response received by the redundant interconnect logic 50 may actually be received from a different core to the core which was issued with the outgoing snoop request, as the snoop response may be received from a primary processing element whereas the outgoing snoop request was issued to a redundant processing element. When the primary and redundant processing elements are in lock step then the snoop response received from the primary element would be expected to be the same as the response which would have been issued by the redundant processing element which was snooped. At step 184 the coherency control logic 28 acts upon the snoop response in a manner appropriate to information indicated in the response. This action could include updating the shared cache 14 or memory 16 with a more up to date value returned from the private cache 12 of a processing element, and/or forwarding the returned data value to a processing element over the requesting processing element interface, as a response to the incoming data access request received at step 160. Also, tracking information in a snoop filter could be updated by the coherency control logic 28 in response to the snoop response.

Figure 8:
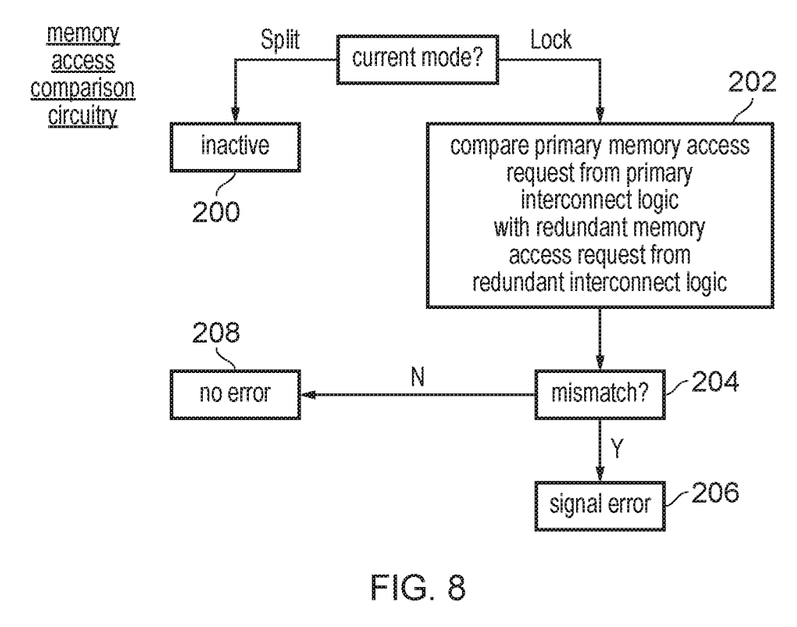
FIG. 8 is a flow diagram showing functions of memory access comparison circuitry in the split and lock modes.

FIG. 8 is a flow diagram showing the function of the memory access comparison circuitry 70. In the split mode, this circuitry is inactive (step 200). In the lock mode, at step 202 the memory access comparison circuitry compares primary memory access requests issued by the primary interconnect logic 40 with a corresponding redundant memory access request issued from the redundant interconnect logic 50. The redundant memory access request is suppressed from being forwarded to the shared cache 14 or the memory 16. At step 204 the comparison circuitry 70 determines whether there is a mismatch between the primary and redundant memory access requests, and if so signals an error at step 206. If the redundant memory access request matches the primary memory access request then at step 208 no error is signalled. This allows any errors in either the primary or redundant interconnect logic 40, 50 to be detected before they corrupt data in the shared cache 14 or memory 16. In the case when the error is signalled at step 206 then the memory access request is prevented from being forwarded to the shared cache 14 or memory 16.

In the examples above, the shared cache capacity is fully accessible to the primary processing elements when in the lock mode, in at least one variant of the lock mode. Some implementations could also support a second variant of the lock mode, in which for power saving some parts of the cache may be disabled, e.g. some ways may be powered down. Hence, it is not essential that all variants of the lock mode must fully utilise the cache capacity. However, in general the system may support at least one variant of the lock mode in which the shared cache capacity and associativity may be fully accessible to the primary processing element(s) during the lock mode.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
 a cluster of processing elements, having a split mode in which the processing elements are configured to process independent processing workloads, and a lock mode in which the processing elements comprise at least one primary processing element and at least one redundant processing element, each redundant processing element configured to perform a redundant processing workload for checking an outcome of a primary processing workload performed by a corresponding primary processing element;
 a shared cache having a predetermined cache capacity accessible to each of the processing elements when in the split mode; in which said predetermined cache capacity of the shared cache is fully accessible to the at least one primary processing element when in the lock mode; and
 control circuitry to provide the at least one redundant processing element with a response to a redundant data access request issued by the at least one redundant processing element in the lock mode, said response based on a cache access to the shared cache triggered by a primary data access request issued by the at least one primary processing element in the lock mode; wherein
 the control circuitry is configured to suppress a cache access to the shared cache from being triggered in response to the redundant data access request when in the lock mode, even when the redundant data access request specifies an address of data cached in the shared cache.

2. The apparatus according to claim 1, comprising comparison circuitry to signal an error when a mismatch is detected between the redundant data access request and the primary data access request when in the lock mode.

3. The apparatus according to claim 1, in which all cache storage of the apparatus is accessible when in the split mode.

4. The apparatus according to claim 1, comprising coherent interconnect circuitry to manage coherency between the shared cache and private caches of the plurality of processing elements.

5. An apparatus comprising:
 a cluster of processing elements, having a split mode in which the processing elements are configured to process independent processing workloads, and a lock mode in which the processing elements comprise at least one primary processing element and at least one redundant processing element, each redundant processing element configured to perform a redundant processing workload for checking an outcome of a primary processing workload performed by a corresponding primary processing element;
 a shared cache having a predetermined cache capacity accessible to each of the processing elements when in the split mode; in which said predetermined cache capacity of the shared cache is fully accessible to the at least one primary processing element when in the lock mode; and
 coherent interconnect circuitry to manage coherency between the shared cache and private caches of the plurality of processing elements, in which the coherent interconnect circuitry comprises primary interconnect circuitry and redundant interconnect circuitry.

6. The apparatus according to claim 5, in which in the split mode, the primary interconnect circuitry is configured to exchange coherency messages with each of the plurality of processing elements.

7. The apparatus according to claim 5, in which in the split mode, the redundant interconnect circuitry is inactive.

8. The apparatus according to claim 5, in which in the lock mode:
 the primary interconnect circuitry is configured to receive coherency messages from the at least one primary processing element and to transmit coherency messages to the at least one primary processing element; and
 the redundant interconnect circuitry is configured to receive coherency messages from the at least one primary processing element and transmit coherency messages to the at least one redundant processing element.

9. The apparatus according to claim 5, comprising routing control circuitry to select whether coherency messages provided to a given redundant processing element are obtained from the primary interconnect circuitry or from the redundant interconnect circuitry.

10. The apparatus according to claim 5, in which in the lock mode:
 the primary interconnect circuitry is configured to issue a primary memory access request to the shared cache or downstream memory in response to a coherency message received from the at least one primary processing element, and
 the redundant interconnect circuitry is configured to issue a redundant memory access request in response to the coherency message received from the at least one primary processing element; and
 the coherent interconnect circuitry comprises comparison circuitry to signal an error when a mismatch is detected between the primary memory access request and the redundant memory access request.

11. The apparatus according to claim 10, in which in the lock mode:
 the primary interconnect circuitry is configured to transmit a coherency message to the at least one primary processing element based on a response to said primary memory access request received from the shared cache or downstream memory; and
 the redundant interconnect circuitry is configured to transmit a coherency message to the at least one redundant processing element based on said response to said primary memory access request received from the shared cache or downstream memory.

12. The apparatus according to claim 5, in which in the lock mode, in response to a data access request issued by a given primary processing element, the redundant interconnect circuitry is configured to transmit a snoop request to the at least one redundant processing element.

13. The apparatus according to claim 12, in which the cluster of processing elements comprises a plurality of primary processing elements and a plurality of redundant processing elements; and in the lock mode, in response to the data access request issued by the given primary processing element, the primary interconnect circuitry is configured to transmit a snoop request to at least one other primary processing element.

14. The apparatus according to claim 5, in which the primary interconnect circuitry comprises a plurality of processing element interfaces;

each processing element interface corresponding to one of the processing elements and configured to exchange coherency messages with the corresponding processing element when in the split mode.

15. The apparatus according to claim 14, in which in the lock mode, at least one processing element interface corresponding to the at least one primary processing element is active, and at least one processing element interface corresponding to the at least one redundant processing element is inactive.

16. The apparatus according to claim 14, in which the redundant interconnect circuitry comprises a plurality of processing element interfaces to mirror corresponding processing element interfaces of the primary interconnect circuitry; and at least one of the processing element interfaces of the redundant interconnect circuitry is inactive in both the split mode and the lock mode.

17. A data processing method for an apparatus comprising a cluster of processing elements, the method comprising:

when in a split mode, processing independent processing workloads using the cluster of processing elements, and accessing a shared cache having a predetermined cache capacity accessible to each of the processing elements in the split mode;

when in a lock mode, performing a primary processing workload on at least one primary processing element of the cluster, and performing a redundant processing workload on at least one redundant processing element of the cluster, each redundant processing workload for checking an outcome of a corresponding primary processing workload performed by a corresponding primary processing element of the cluster; in which:

said predetermined cache capacity of the shared cache is fully accessible to the at least one primary processing element when in the lock mode;

when in lock mode, providing the at least one redundant processing element with a response to a redundant data access request issued by the at least one redundant processing element, said response based on a cache access to the shared cache triggered by a primary data access request issued by the at least one primary processing element; and suppressing a cache access to the shared cache from being triggered in response to the redundant data access request when in the lock mode, even when the redundant data access request specifies an address of data cached in the shared cache.

* * * * *